(12) United States Patent
Long et al.

(10) Patent No.: US 6,739,241 B2
(45) Date of Patent: May 25, 2004

(54) CAMPING COFFEE MAKER (75) Inventors: Norris Richard Long, Wichita, KS (US); Randy May, Andover, KS (US)

(73) Assignee: The Coleman Company, Inc., Wichita, KS (US)

( * ) Notice: Subject to any disclaimer, the term of this patent is extended or adjusted under 35 U.S.C. 154(b) by 18 days.

(21) Appl. No.: 10/213,206

(22) Filed: Aug. 5, 2002

(65) Prior Publication Data

US 2004/0020369 A1 Feb. 5, 2004

(51) Int. Cl.⁷ .................................................. A47J 31/00
(52) U.S. Cl. ............................ 99/288; 99/279; 99/307
(58) Field of Search .......................... 99/307, 308, 306, 99/279, 288

(56) References Cited

U.S. PATENT DOCUMENTS

| | | |
|---|---|---|
| 384,411 A | 6/1888 | Babin |
| 683,259 A | 9/1901 | Durel |
| 959,110 A | 5/1910 | Buck |
| 1,115,451 A | 10/1914 | Pons et al. |
| 1,247,396 A | 11/1917 | Guimaraes |
| 1,574,154 A | 2/1926 | Kelly |
| 1,655,014 A | 1/1928 | Herring |
| RE17,077 E | 9/1928 | Pouget |
| 1,754,553 A | 4/1930 | Hagel |
| 1,845,020 A | 2/1932 | Haines |
| 1,852,356 A | 4/1932 | Mercier |
| 1,882,140 A | 10/1932 | Haines |
| 2,065,211 A | 12/1936 | Carvalho |
| 2,574,587 A | 11/1951 | Pames et al. |
| 4,557,187 A | 12/1985 | DePonti |

*Primary Examiner*—Reginald L. Alexander
(74) *Attorney, Agent, or Firm*—Leydig, Voit & Mayer, Ltd.

(57) ABSTRACT

A drip coffee maker that may be used over an open flame, such as a flame from a camping stove. The coffee maker may include an upper portion having conventional automatic drip coffee maker components. To protect the upper portion components, a base for the coffee maker is designed to direct the open flame away from the plastic components and to dissipate heat from the open flame so that the plastic components will not burn. In addition, the coffee maker includes a wrap assembly and heat sink that are arranged to fit around a decanter for the coffee maker, and which are configured to dissipate heat from the flame and away from the upper coffee maker components.

28 Claims, 5 Drawing Sheets

CAMPING COFFEE MAKER

TECHNICAL FIELD OF THE INVENTION

The present invention is directed to coffee makers, and more specifically to a coffee maker for use on an open flame.

BACKGROUND OF THE INVENTION

Camping is a popular recreational activity enjoyed by many. Some people camp so that they may enjoy the outdoors, and others use camping as an inexpensive alternative to staying in hotels.

Although many campers enjoy being in the outdoors, often campers like to enjoy the luxuries of home while camping. For example, many campers bring lounge chairs or hammocks, portable air mattresses or cots, and similar items to make a camping experience more comfortable.

One area in which camping devices are not as convenient as in the modern home is in coffee making. Brewing coffee, also called a dripped coffee method, is the most common home coffee making method. To produce brewed coffee, hot, but not boiling, water drips through coffee grinds and the hot water extracts coffee particles from the grinds to form coffee. The coffee often drips into a coffee pot or a thermal carafe.

For home brewing of coffee, most people use automatic drip coffee (ADC) makers. While most automatic drip coffee makers are portable, they require an AC power supply to function. An AC power is typically not available when camping. Thus, most campers resort to boiling water over an open fire or on a camp stove and mixing the boiling water with instant coffee. Another method for making coffee while camping is to use a coffee percolator that can be placed directly onto a fire or a camp stove. However, neither of these methods produces coffee with the flavor and in the same manner to which a user is accustomed in the modern home environment.

SUMMARY OF THE INVENTION

The present invention provides a drip coffee maker that may be used over an open flame, such as a flame from a camping stove. The coffee maker may include an upper portion having conventional automatic drip coffee maker components, such as a water reservoir housing, a spray shower head, and a brew basket, all of which may be made of plastic materials and may be shaped in conventional form. To protect the upper portion components, a base for the coffee maker is designed to direct the open flame away from the plastic components and to dissipate heat from the open flame so that the plastic components will not burn. In addition, the coffee maker includes a wrap assembly and heat sink that are arranged to fit around a decanter for the coffee maker, and which are configured to dissipate heat from the flame and away from the upper coffee maker components.

In accordance with one aspect of the present invention, a base for the coffee maker is shaped like an upside-down U, with the sides of the undersurface of the upside-down U forming side vents that vent flames and heat to the sides of the coffee maker and not toward the front and back. In this manner, cool spots are created at the front and back of the base. The front cool spot protects a handle for a decanter of the coffee maker from overheating, and the back cool spot protects the upper coffee maker components from being damaged due to heat.

A boiler plate for the coffee maker is mounted underneath a top portion of the base and is spaced from the top surface of the base. A heater tube is attached to the boiler plate. During operation, water flows from the reservoir through the heater tube and up to the shower head. The boiler plate is preferably formed of a thermally-conductive material such as copper, and is arranged so that it is in direct contact with the flame. The boiler plate is spaced from the top of the base so that the base does not get too hot during operation, but is sufficiently warm so that a decanter resting on the top may be kept warm. To this end, the base also includes an indentation on the top surface for seating the decanter during warming.

In accordance with another aspect of the present invention, a heat sink partially surrounds the decanter in the area of the wrap assembly. The heat sink is designed to direct heat away from the sides and front of the coffee maker so that the heat may be dissipated at the rear of the coffee maker. The wrap assembly is a hollow structure having vents, or louvers, at a back portion. The vents allow air to flow into and out of the wrap assembly so as to permit further cooling. The wrap assembly is designed so that it fits over the back portion of the base and thus is removed from the flame. The heat sink extends around the front portion of the wrap assembly so that it may direct heat at the front portion of the wrap assembly to the back portion.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Figure 1:
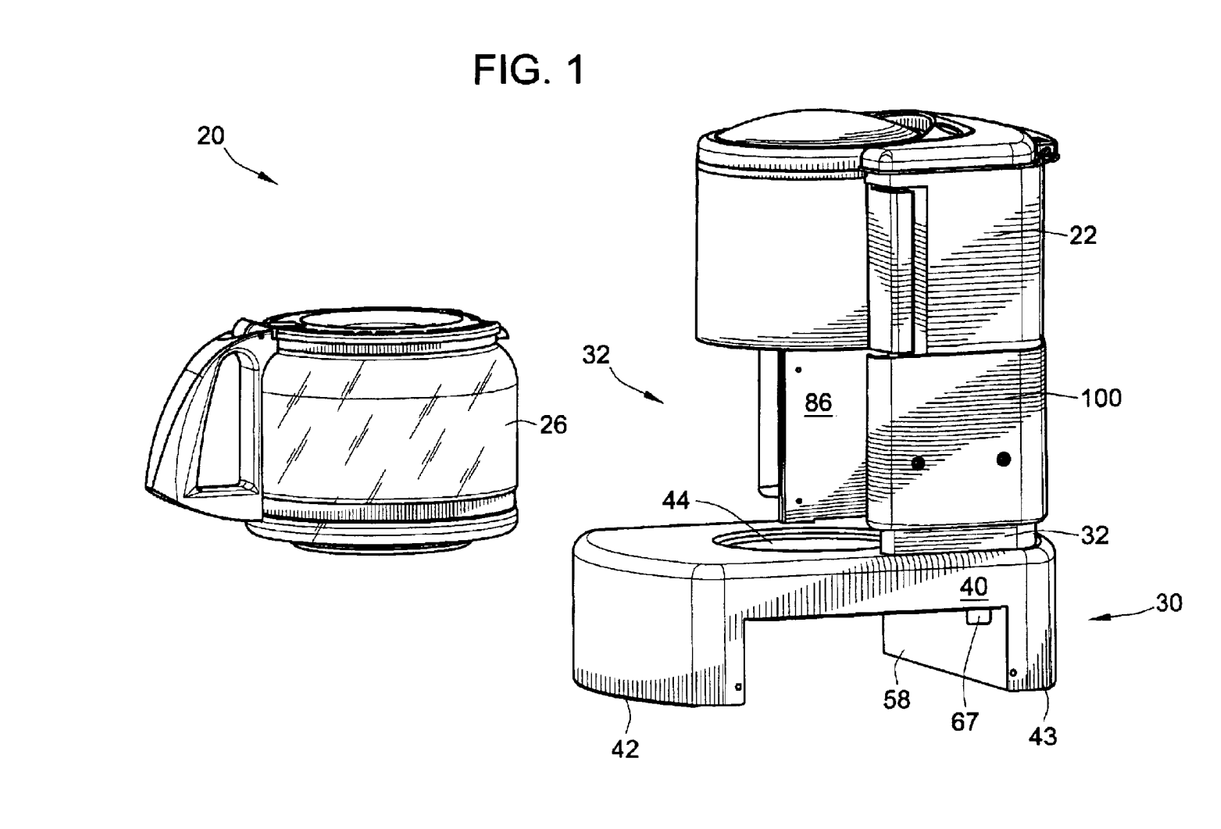
FIG. 1 is a side perspective view of a coffee maker made in accordance with the present invention.
Figure 2:
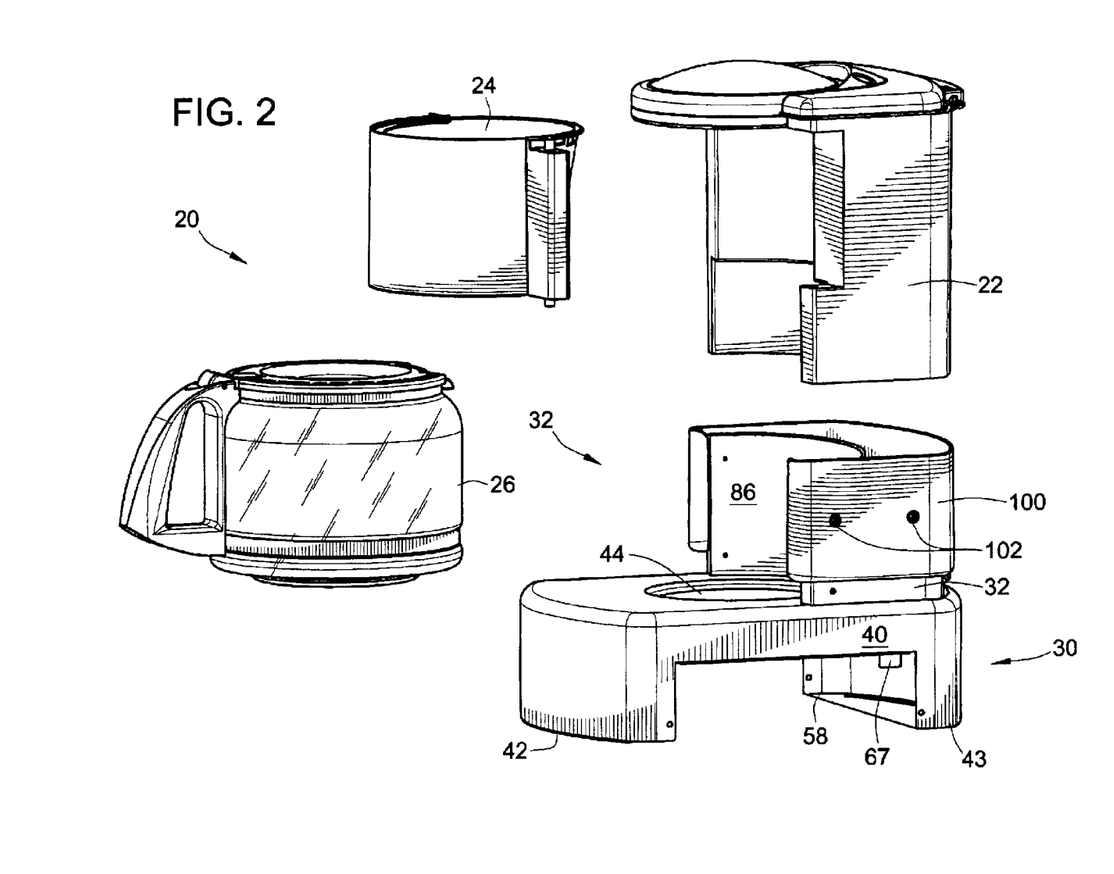
FIG. 2 is an exploded side perspective view of the coffee maker of FIG. 1.

Referring now to the drawings, in which like reference numerals represent like parts throughout the several views, FIG. 1 shows a coffee maker 20 in accordance with the present invention. The coffee maker 20 includes a reservoir housing 22 that is similar in construction to reservoir housings used for conventional automatic drip coffee makers. A brew basket 24 (FIG. 2) fits in the top of the reservoir housing 22. A decanter 26 is configured so that it can fit against the reservoir housing 22 and underneath the brew basket 24. "Decanter" is used broadly to include any receptacle into which coffee can be brewed, including, but not limited to, coffee pots and carafes.

The structure of the reservoir housing 22, the brew basket 24 and the decanter 26 are known in the art. In general, as is known, a typical conventional automatic drip coffee maker includes a water reservoir and a coffee brew basket (e.g., similar to the reservoir and the brew basket 24 in the reservoir housing 22). For conventional AC-powered automatic drip coffee makers, water is poured into the reservoir and a user starts the brewing cycle, either by pressing an "on" button or setting the time for the brewing cycle and that time elapsing. Upon starting the brewing cycle, water flows from the reservoir through a heater of some kind, usually a heater tube. The heater tube is heated by the AC power supplied to the conventional automatic drip coffee maker. Heating the water in the heater tube causes the water to be pressurized, causing the water to flow to the shower head. The shower head is typically mounted above the brew basket, and water drips from the shower head into the brew basket, through the coffee grinds, and into a coffee pot or thermal carafe.

As used herein, the reservoir housing is a housing that includes one or both of a reservoir and the brew basket 24. Many alternative arrangements may be used to the reservoir housing 22 shown in the drawings.

Unlike conventional automatic drip coffee makers, the coffee maker 20 of the present invention does not include an AC power source, but instead includes a base 30 that is configured to be situated over an open flame, such as a flame from a camp stove. Such camp stoves are known in the art, and are supplied by such companies as The Coleman Company, Inc., the assignee of the present invention.

In addition to the base 30, the coffee maker 20 includes a wrap assembly 32 and a heat sink 100 that are configured to dissipate heat from the flame and keep the heat away from the reservoir housing 22, which preferably is made of a plastic. By directing heat away from the reservoir housing 22, the plastic parts of the reservoir housing 22 are protected.

Figure 3:
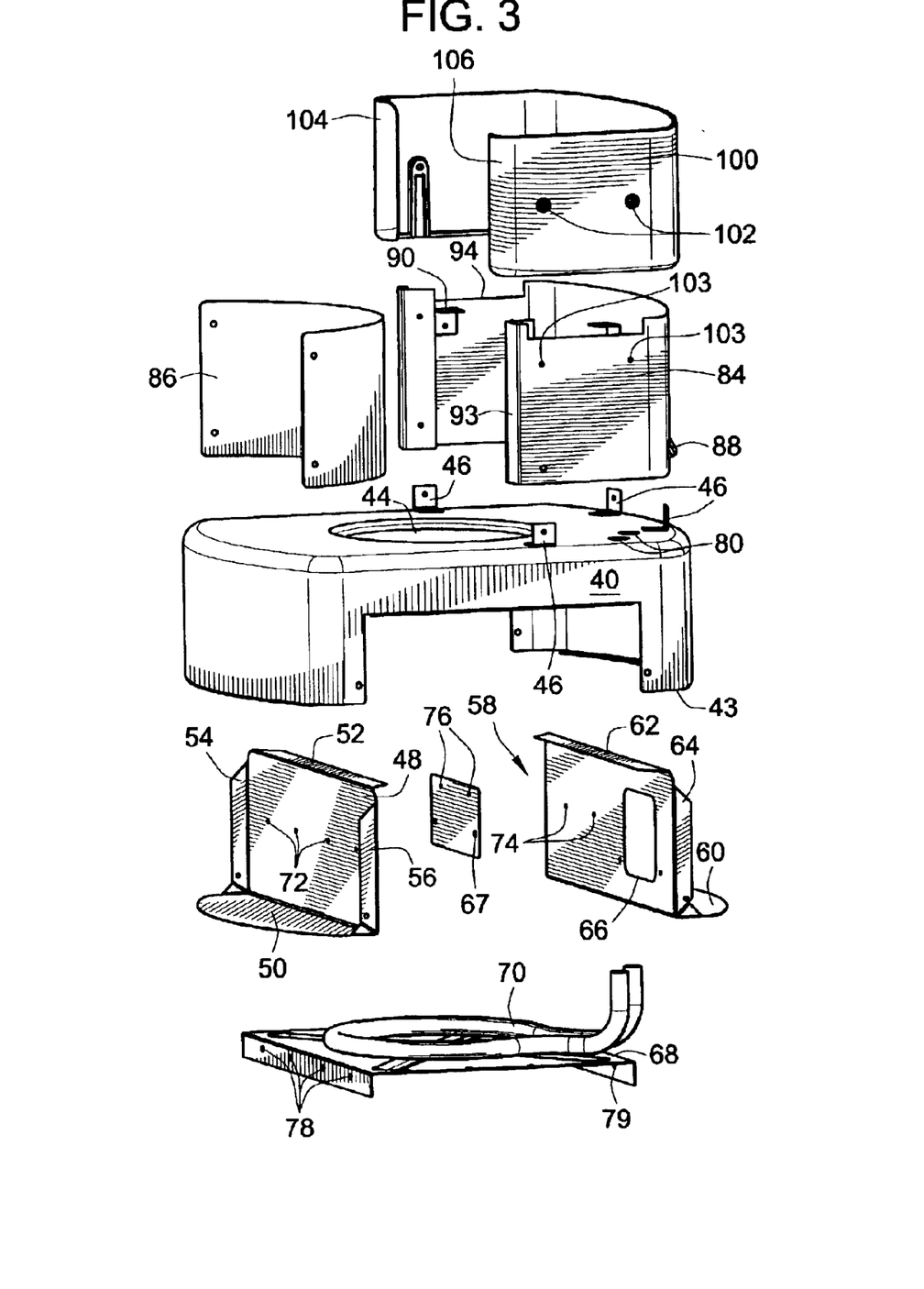
FIG. 3 is an exploded side perspective view of a base, wrap assembly, and heat sink for the coffee maker of FIG. 1.

The details of the base 30 are best shown in FIG. 3. The base 30 includes a U-shaped base piece 40 that is arranged so that the open portion of the U faces downward. The U-shaped base piece 40 includes a pair of rounded ends 42, 43 that extend farther down than a central portion of the base piece 40.

A decanter holder 44 is stamped into a top surface of the base piece 40. The decanter holder 44 is situated and configured so as to receive a bottom portion of the decanter 26 when the decanter 26 is situated below the brew basket 24.

The U-shaped base piece 40 is preferably formed of steel, but other suitable materials may be used. However, if materials other than steel are used for the U-shaped base piece 40, the materials are preferably at least somewhat thermally conductive so that heat may be transferred through the U-shaped base piece 40 to the decanter holder 44 so that the decanter 26 may be kept warm after coffee is brewed.

A series of flanges 46 are attached to the top surface of the U-shaped base piece 40. These flanges extend along the top surface of the U-shaped base piece 40 and bend upward so that the wrap assembly 32 may be attached to the flanges 46.

The bottom portion of the U-shaped base piece 40 is hollowed out so as to form concave openings. The concave openings at the rounded ends 42, 43 are closed by a front insert 48 and a back insert 58 (FIG. 3). The front insert 48 includes a lower lip 50, an upper flange 52, and side flanges 54, 56. The lower lip 50 preferably fits against a bottom portion of the front rounded end 42 of the U-shaped base piece 40. The upper flange 52 fits against a lower portion of the inside of the U-shaped base piece 40, but preferably is not welded or otherwise connected to the U-shaped base piece 40.

The back insert 58 is shaped similar to the front insert 48, and includes a lower lip 60, an upper flange 62, and side flanges 64 (only one of which is shown in FIG. 3). In addition, the back insert includes an opening 66 over which a closure panel 67 fits. Like the front insert 48, the back insert 58 fits into a rounded end (the back rounded end 43) of the U-shaped base piece 40, and substantially closes off that concave opening on the inside of the U-shaped base piece 40.

A boiler plate 68 is mounted underneath the central portion of the U-shaped base piece 40. The boiler 68 includes a heater tube 70 welded, brazed, or otherwise attached to the top of the boiler plate 68. Preferably, the heater tube 70 is arranged relative to the boiler plate 68 to maximize thermal conductivity therebetween. If desired, the heater tube 70 could be arranged partially through the boiler plate 68, or underneath the boiler plate 68, but applicants have found that the shown embodiment works particularly well.

To assemble the base 30, the front insert 48 and the back insert 58 are placed in position and are screwed or otherwise attached into place. The ends of the heater tube 70 are extended into the opening 66 and out through openings 80 in the top of the U-shaped base piece 40. The closure panel 67 then is placed over the bottom of the opening 66, with the top part of the opening 66 filled by the heater tube 70. Holes 72 on the front insert 48 are then aligned with holes 78 on the boiler plate 68, and screws or other suitable fasteners are inserted to attach the two pieces. Similarly, holes 74 on the back insert 58 and holes 76 on the closure panel 67 are aligned with holes 79 (only one of which is shown in FIG. 3) on the boiler plate 68. Suitable fasteners are used to attach these two pieces.

When the boiler plate 68 and the front insert 48 and the back insert 58 are in place, the open concave portions of the U-shaped base piece 40 are closed off so that, when facing a bottom portion of the base 30, all that can be seen is the lower lips 50, 60 of the front and back inserts 48, 58 and the lower portion of the boiler plate 68. Because of the positioning of the boiler plate 68 relative to the front and back inserts 48, 58, the boiler plate 68 and the heater tube 70 are spaced from the top of the U-shaped base piece 40. In addition, the decanter holder 44 is spaced from the boiler plate 68 and the heater tube 70.

Figure 4:
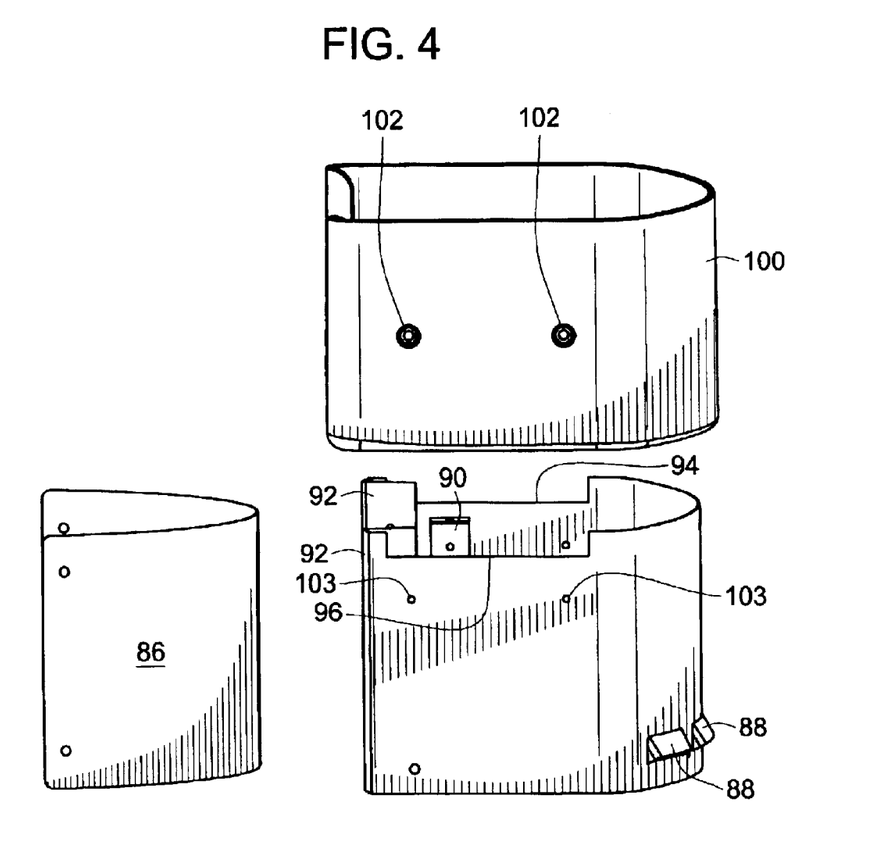
FIG. 4 is an exploded side perspective view of the wrap assembly and heat sink of FIG. 3.
Figure 5:
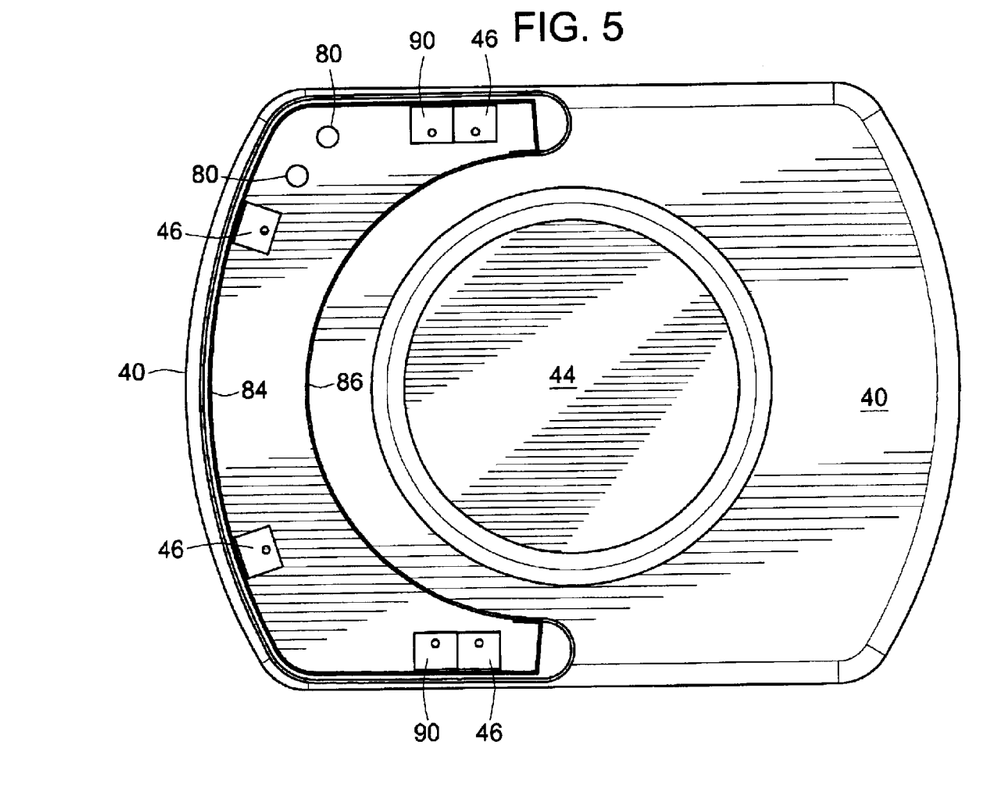
FIG. 5 is a top view of base, wrap assembly, and heat sink for the coffee maker of FIG. 1.

The wrap assembly 32 can best be seen in FIGS. 3 and 4. Although one embodiment is shown in these drawings, the wrap assembly may be any structure that connects the base 30 and the reservoir housing 22. For the wrap assembly 32 shown in the drawings, a back panel 84 extends upward and along a rear portion of the U-shaped base piece 40. An inner cover 86 fits within the back panel 84. A top view of these two panels 84, 86 and how they fit relative to one another can be seen in FIG. 5. Each one of these panels 84, 86 is shaped so that a concave portion faces the front, or decanter-receiving side of the base 30. The two panels 84, 86 thus fit together to form a concave, hollow wall.

The back panel 84 is attached to the flanges 46 and includes louvers 88 bent out of a rear, bottom portion. Internal flanges 90 are mounted around the inside of the back panel 84. The reservoir housing 22 is mounted on top of these internal flanges 90. The front ends of the back panel 84 wrap around to form angled leading edges 92, 93. The inner cover 86 fits against these angled leading edges 92, 93 so that there is an enclosed space defined by the inner cover 86 and the back panel 84.

Cut-outs 94, 96 are located at the top side portions of the back panel 84. These cut-outs 94, 96 extend downward below the edges of the remainder of the back panel 84 and the top edges of the inner cover 86 when mounted to the back panel 84. The back panel 84 and the inner cover 86 may be made of steel or another suitable metal or material that has sufficient structural integrity to withstand the high heats of the coffee maker 20 and still support the reservoir housing 22.

The heat sink 100 is preferably aluminum or another sufficiently thermally conductive material. The heat sink 100 is U-shaped and fits around the wrap assembly 32. In the embodiment shown in the drawings, the heat sink 100 fits along a top portion of the back panel 84, for example via holes 102 that align with holes 103 on the top portion of the back panel 84. The heat sink 100 includes wrap around front edges 104, 106 that extend around and cover the angled leading edges 92, 93 of the back panel 84, as well as the leading edges of the inner cover 86. This arrangement can best be seen in FIG. 5.

In use, the base 30 is situated over an open flame, such as a flame from a burner of a camp stove. Preferably, the burner plate 68 is centered over a center of the flame, so that the flame is mostly situated underneath the boiler plate 68. During operation, the flame heats the bottom of the boiler plate 68, and may slightly flow out from underneath the U-shaped base piece 40 at the central portions of the U-shaped base piece 40. However, the front insert 48 and the back insert 58 prevent the flame from extending to the front and rear ends of the U-shaped base piece 40. To this end, the front and back inserts 48, 58 completely close off the front and rear portions of the U-shaped base piece 40 so that a flame may not flow into the front and rear portions of the U-shaped base piece 40. In this manner, the U-shaped base piece 40 includes two cool zones, at the front and the rear of the U-shaped base piece 40. The front cool zone of the U-shaped base piece 40 protects the handle of the decanter 26, preventing melting of the handle or overheating of the handle. The rear cool zone of the U-shaped base piece 40 protects the wrap assembly 32 from overheating, and therefore also protects the reservoir housing 22.

When a flame is located below the boiler plate 68, the boiler plate 68, because it is highly thermally conductive, heats the heater tube 70, providing the heat appropriate for brewing of coffee. Thus, like conventional AC-powered automatic drip coffee makers, water flows downward from the reservoir and is heated by a heater, in this case the heater tube 70. The heated water is pressurized and then flows upward to a shower head (not shown, but known in the art) mounted above the brew basket 24.

Because the boiler plate 68 is spaced from the bottom of the U-shaped base piece 40 and the decanter holder 44, the decanter holder 44 does not get as hot as the boiler plate 68. Moreover, because the upper flanges 52, 62 of the front insert and the back insert 48, 58 are not attached to the top, underside surface of the U-shaped base piece 40, thermal conduction is minimized between the boiler plate 68 and the top surface of the U-shaped base piece 40. In this manner, the decanter holder 44 may be maintained at a sufficient temperature to keep coffee warm, but is not heated to a level such that coffee in the decanter 26 boils.

In summary, the base 30 has several functions. First, it provides support for the reservoir housing 22, as well as the wrap assembly 32 and the heat sink 100. Second, the base 30 acts as a shield for the reservoir housing 22 from the direct heat of the flame. Third, the base 30 supports the boiler plate 68 and the heater tube 70 above the flame so that they may be directly heated by the flame. Fourth, the U-shaped base piece 40 of the base 30 channels heat of the flame to the sides, away from the front of the base 30 and the rear of the base 30, protecting the handle of the decanter 26 and the reservoir housing 22. Fifth, the base 30 provides a support for the decanter 26 to rest.

As long as water is being heated in the heater tube 70, the heat of the flame is being used. However, after all water is heated, the flame temperature increases and more heat is released into the coffee maker 20. The base 30, the wrap assembly 32, and the heat sink 100 are configured and arranged to dissipate the heat before it reaches the plastic parts in the reservoir housing 22 so that the plastic reservoir does not melt. For the base 30, there are two layers of metal (e.g., the boiler plate 68 and the U-shaped base piece 40) between the flame and the plastic parts. In addition, as described above, the majority of the heat is channeled out of the sides of the U-shaped base piece 40, creating cool zones in the front and rear of the base 30. The rear cool zone permits cool air to be drawn into the louvers 88 on the rear of the back panel 84. The cool air flows between the back panel 84 and the inner cover 86, cooling these panels and permitting heat that is transferred to the panels to be dissipated.

The heat sink 100 wraps around two sides and the back of the lower portion of the reservoir housing 22 and acts as a shield for the reservoir housing 22. Cool air drawn in through the louvers 88 is exhausted out the sides of the wrap assembly 32 and is vented up between the heat sink 100 and the reservoir housing 22 to help cool the sides of the reservoir housing 22. In addition, the heat sink 100 removes excess heat from the sides of the wrap assembly 32 and moves it to the cooler back side of the wrap assembly 32. This feature is particularly of relevance when flames and excess heat flow around the sides of the U-shaped base piece 40 and up toward the reservoir housing 22. The flames and heat that are flowing in this manner for the most part are exhausted outward by the shape of the U-shaped base piece 40. However, to the extent the flames and heat are directed inward toward the reservoir housing, the wrap around front edges 104, 106 of the heat sink 100 absorb much of the heat. To this end, the wrap around front edges 104, 106 add additional protection over a heat sink that does not extend around the front of the wrap assembly. Moreover, because the heat sink 100 is highly thermally conductive, the heat is transferred to the cooler back portions of the heat sink where it may be dissipated. The cool air that is directed through the wrap assembly 32 in through the louvers 88 and out of the cutouts 94, 96 aids in dissipated the heat absorbed by the heat sink 100.

As can be understood from the foregoing, the coffee maker 20 of the present invention includes several features that protect the plastic parts of the reservoir housing 22 from melting. In addition, components of the coffee maker 20 are arranged and configured to provide quick heating of water for the coffee brewing process.

If desired, the coffee maker 20 of the present invention may be mounted on a burner other than a burner of a camp stove. For example, a burner may be built into the base 30 below the boiler plate 68. The burner may be connected to a sensor or valve between the reservoir and the shower head for the coffee maker 20. The sensor determines whether all of the water has been boiled out of the reservoir. Alternatively, the sensor may use an increase of temperature of the coffee maker 20 to determine that all water has been boiled. As a result of a determination that all water has flown out of the reservoir and the coffee has been brewed, the burner may automatically adjust to a lower setting for keeping the coffee warm after the brewing process.

Other variations are within the spirit of the present invention. Thus, while the invention is susceptible to various modifications and alternative constructions, a certain illustrated embodiment thereof is shown in the drawings and has been described above in detail. It should be understood however, that there is no intention to limit the invention to the specific form or forms disclosed, but on the contrary, the intention is to cover all modifications, alternative instructions, and equivalents falling within the spirit and scope of the invention, as defined in the appended claims.

What is claimed is:

1. An automatic drip coffee maker, comprising:
   a reservoir housing including a water reservoir;
   a heater connected to the water reservoir and configured to receive water from the reservoir; and
   a base that is configured to fit over an open flame, the base supporting the reservoir housing and the heater, the heater being located so that, when the base is placed over a flame, the flame heats water in the heater for a coffee brewing process, the base comprising:
      a platform heated by the flame and for receiving a decanter, the decanter being heated by the heated platform; and
      a first wall extending down from the platform for directing the flame away from the reservoir housing.

2. The automatic drip coffee maker of claim 1, wherein the heater is a heater tube.

3. The automatic drip coffee maker of claim 2, wherein the heater tube is connected to a boiler plate that is arranged so that, when the base is placed over a flame, the boiler plate is in direct contact with the flame.

4. The automatic drip coffee maker of claim 1, wherein the base further comprises a second wall extending down from the platform for directed the flame away from a handle of the decanter.

5. The automatic drip coffee maker of claim 4, wherein the base is configured in the shape of an upside-down U, with the first and second walls forming the legs of the upside-down U, so that, when the base is placed over a flame, the flame is positioned under a base of the upside-down U.

6. The automatic drip coffee maker of claim 5, wherein the heater is connected to a boiler plate that is arranged on the bottom of the base of the upside-down U.

7. The automatic drip coffee maker of claim 6, wherein the base comprises a decanter holder vertically spaced from the boiler plate and located on top of the upside-down U.

8. The automatic drip coffee maker of claim 7, wherein an air gap is located between the decanter holder and the boiler plate.

9. The automatic drip coffee maker of claim 5, wherein the upside-down U is configured so that, when the base is placed over a flame, heat from the flames is vented out of sides of the upside-down U, and away from the reservoir housing.

10. The automatic drip coffee maker of claim 9, wherein the reservoir housing is mounted over an end of the upside-down U.

11. The automatic drip coffee maker of claim 10, further comprising a heat sink mounted between the base and the reservoir housing.

12. The automatic drip coffee maker of claim 11, further comprising a hollow structure between the reservoir housing and the base and onto which the heat sink is mounted.

13. The automatic drip coffee maker of claim 12, further comprising air vents in the hollow structure for permitting air to flow through the hollow structure.

14. The automatic drip coffee maker of claim 13, wherein the air vents comprise a first opening on the back of the hollow structure and a second opening adjacent an area between the heat sink and the reservoir housing.

15. The automatic drip coffee maker of claim 14, wherein the openings on the back of the hollow structure comprise louvers.

16. The automatic drip coffee maker of claim 12, wherein the hollow structure is configured to wrap at least partly around a decanter that is seated on the base.

17. The automatic drip coffee maker of claim 11, wherein the heat sink is configured to wrap at least partly around a decanter that is seated on the base.

18. An automatic drip coffee maker, comprising:
   a reservoir housing including a water reservoir;
   a heater tube connected to the water reservoir and configured to receive water from the reservoir;
   a base that is configured to fit over an open flame, the base supporting the reservoir housing and the heater, the heater being located so that, when the base is placed over a flame, the flame heats water in the heater for a coffee brewing process, the base comprising a decanter holder vertically spaced from the boiler plate; and
   a boiler plate connected to the heater tube and that is arranged so that, when the base is placed over a flame, the boiler plate is in direct contact with the flame.

19. The automatic drip coffee maker of claim 18, wherein an air gap is located between the decanter holder and the boiler plate.

20. An automatic drip coffee maker, comprising:
   a reservoir housing including a water reservoir;
   a heater connected to the water reservoir and configured to receive water from the reservoir;
   a base that is configured to fit over an open flame, the base supporting the reservoir housing and the heater, the heater being located so that, when the base is placed over a flame, the flame heats water in the heater for a coffee brewing process; and
   a heat sink mounted between the base and the reservoir housing.

21. The automatic drip coffee maker of claim 20, further comprising a hollow structure between the reservoir housing and the base and onto which the heat sink is mounted.

22. The automatic drip coffee maker of claim 21, further comprising air vents in the hollow structure for permitting air to flow through the hollow structure.

23. The automatic drip coffee maker of claim 22, wherein the air vents comprise a first opening on the back of the hollow structure and a second opening adjacent an area between the heat sink and the reservoir housing.

24. The automatic drip coffee maker of claim 23, wherein the openings on the back of the hollow structure comprise louvers.

25. The automatic drip coffee maker of claim 21, wherein the hollow structure is configured to wrap at least partly around a decanter that is seated on the base.

26. The automatic drip coffee maker of claim 20, wherein the heat sink is configured to wrap at least partly around a decanter that is seated on the base.

27. An automatic drip coffee maker, comprising:
   a reservoir housing including a water reservoir;
   a heater connected to the water reservoir and configured to receive water from the reservoir;

a base comprising an upside-down U shape configured to fit over an open flame;

a wrap assembly mounted between the base and the reservoir housing; and a heat sink mounted on the wrap assembly.

28. An automatic drip coffee maker, comprising:

a reservoir housing including a water reservoir;

a heater connected to the water reservoir and configured to receive water from the reservoir;

a decanter having a decanter handle; and a base that is configured to fit over an open flame, the base supporting the reservoir housing and the heater, the heater being located so that, when the base is placed over a flame, the flame heats water in the heater for a coffee brewing process, the base comprising:

a platform heated by the flame and for receiving the decanter, the decanter being heated by the heated platform; and a first wall extending down from the platform for directing the flame away from the decanter handle.

* * * * *